US012681478B2

(12) United States Patent
Sørensen et al.

(10) Patent No.: US 12,681,478 B2
(45) Date of Patent: *Jul. 14, 2026

(54) METHOD FOR MARKING A GROUND SURFACE USING A ROBOT UNIT AND A LOCAL BASE STATION, THE SYSTEM THEREFORE AND USE THEREOF

(71) Applicant: Turf Tank ApS, Svenstrup J (DK)

(72) Inventors: Anders Ulrik Sørensen, Hjørring (DK); Andreas Ydesen, Hjørring (DK)

(73) Assignee: Turf Tank ApS, Svenstrup J (DK)

( * ) Notice: Subject to any disclaimer, the term of this patent is extended or adjusted under 35 U.S.C. 154(b) by 94 days.

This patent is subject to a terminal disclaimer.

(21) Appl. No.: 18/608,456

(22) Filed: Mar. 18, 2024

(65) Prior Publication Data

US 2024/0219910 A1    Jul. 4, 2024

Related U.S. Application Data

(63) Continuation of application No. 17/051,191, filed as application No. PCT/DK2019/050135 on May 2, 2019, now Pat. No. 11,966,235.

(51) Int. Cl.
G05D 1/02        (2020.01)
A63C 19/06       (2006.01)
            (Continued)

(52) U.S. Cl.
CPC ........... G05D 1/0278 (2013.01); A63C 19/06 (2013.01); B25J 13/006 (2013.01); E01C 23/163 (2013.01);
            (Continued)

(58) Field of Classification Search
CPC .. A63C 19/06; A63C 2019/067; B25J 13/006; E01C 23/163; G01S 19/07;
            (Continued)

(56) References Cited

U.S. PATENT DOCUMENTS 5,928,306 A     7/1999  France
6,304,210 B1   10/2001  Allison et al.
            (Continued)

FOREIGN PATENT DOCUMENTS

DE          19921995 A1    11/2000
WO        2014013415 A1     1/2014
            (Continued)

OTHER PUBLICATIONS

International Search Report for PCT/DK2019/050135 issued Jul. 4, 2019.

(Continued)

*Primary Examiner* — Tyler J Lee

(74) *Attorney, Agent, or Firm* — Schmeiser Olsen PLLC

(57)            ABSTRACT

Provided is a method for marking a ground surface according to a predefined marking pattern using a system including a robot unit and a local base station including acts of providing two flag points, receiving global positioning data of the robot unit using a robot GNSS receiver, receiving global positioning data of the local base station using a base GNSS receiver, and establishing a local base station position using the received global positioning data of the local base station. A method wherein the predefined marking pattern is arranged relative to the two flag point positions and wherein the local base station position is a system reference point of the system. Also provided is a system for marking a ground surface according to a predefined marking pattern and the use thereof or parts thereof.

17 Claims, 9 Drawing Sheets

100,200,300

(51) Int. Cl.

| | |
|---|---|
| *B25J 13/00* | (2006.01) |
| *E01C 23/16* | (2006.01) |
| *G01S 19/07* | (2010.01) |
| *G01S 19/12* | (2010.01) |
| *G01S 19/14* | (2010.01) |
| *G01S 19/19* | (2010.01) |
| *G01S 19/43* | (2010.01) |
| *G01S 19/48* | (2010.01) |
| *G05D 1/00* | (2006.01) |
| *G05D 1/246* | (2024.01) |
| *G05D 1/247* | (2024.01) |
| *G05D 1/248* | (2024.01) |
| *G05D 1/43* | (2024.01) |

(52) U.S. Cl.
CPC ............ *G01S 19/07* (2013.01); *G01S 19/071* (2019.08); *G01S 19/073* (2019.08); *G01S 19/12* (2013.01); *G01S 19/14* (2013.01); *G01S 19/19* (2013.01); *G01S 19/43* (2013.01); *G01S 19/48* (2013.01); *G05D 1/02* (2013.01); *G05D 1/0274* (2013.01); *G05D 1/028* (2013.01); *G05D 1/246* (2024.01); *G05D 1/247* (2024.01); *G05D 1/248* (2024.01); *G05D 1/43* (2024.01); *A63C 2019/067* (2013.01)

(58) Field of Classification Search
CPC ....... G01S 19/071; G01S 19/073; G05D 1/02; G05D 1/0274; G05D 1/0278
See application file for complete search history.

(56) References Cited

U.S. PATENT DOCUMENTS

| | | | |
|---|---|---|---|
| 8,018,376 | B2 | 9/2011 | McClure et al. |
| 8,532,885 | B1 | 9/2013 | Whitehead |
| 8,634,993 | B2 | 1/2014 | McClure et al. |
| 8,803,735 | B2 | 8/2014 | McClure |
| 9,255,992 | B2 | 2/2016 | McClure |
| 10,209,714 | B2 | 2/2019 | Medagoda et al. |
| 11,091,192 | B2 | 8/2021 | McMickell et al. |
| 11,156,718 | B2 | 10/2021 | Takeda |
| 2003/0208311 | A1 | 11/2003 | McClure |
| 2006/0177101 | A1 | 8/2006 | Kato et al. |
| 2009/0322600 | A1 | 12/2009 | Whitehead et al. |
| 2010/0185366 | A1 | 7/2010 | Heiniger et al. |
| 2019/0339710 | A1* | 11/2019 | Sørensen ............... G05D 1/028 |

FOREIGN PATENT DOCUMENTS

| | | |
|---|---|---|
| WO | 2015158347 A1 | 10/2015 |
| WO | 2017063652 A1 | 4/2017 |
| WO | 2018007365 A1 | 1/2018 |

OTHER PUBLICATIONS

Written Opinion for PCT/DK2019/050135 issued Jul. 4, 2019.
Danish Search Report for Application PA 2018 70263 issued Oct. 30, 2018.
Non-Final Office Action dated Aug. 25, 2023, for U.S. Appl. No. 17/051,191, filed Oct. 28, 2020.
Notice of Allowance and Issue Fee Due dated Dec. 20, 2023, for or U.S. Appl. No. 17/051,191, filed Oct. 28, 2020.

* cited by examiner 100,200,300

100
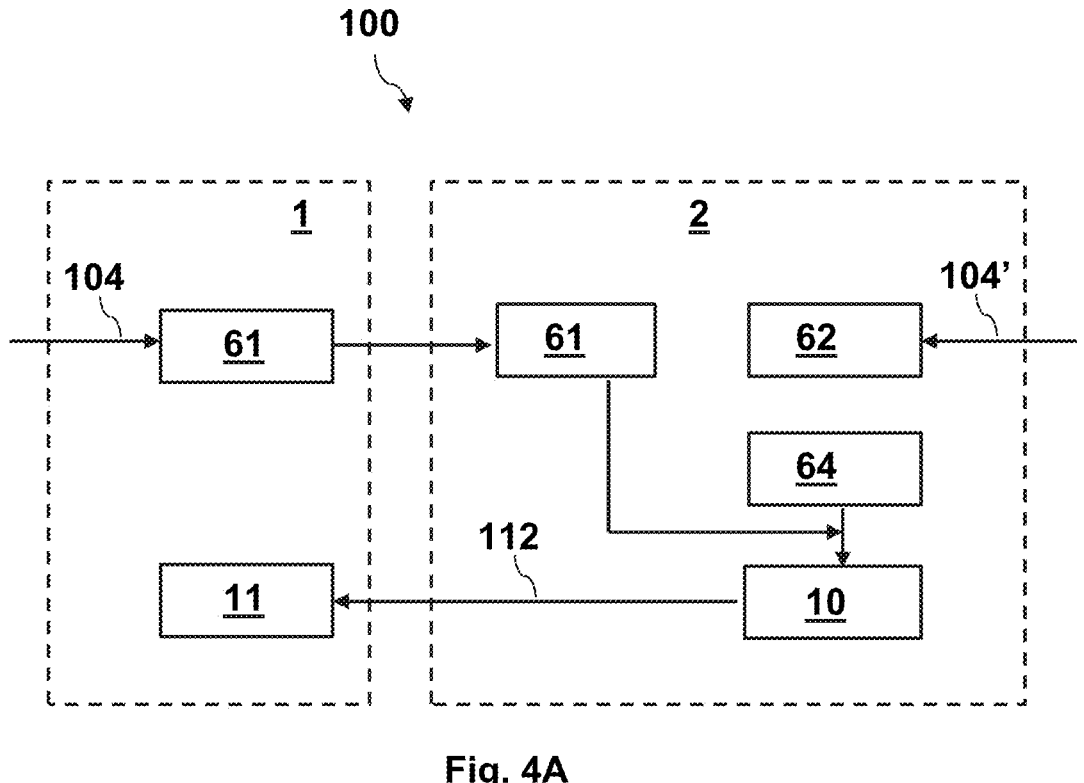
Fig. 4A
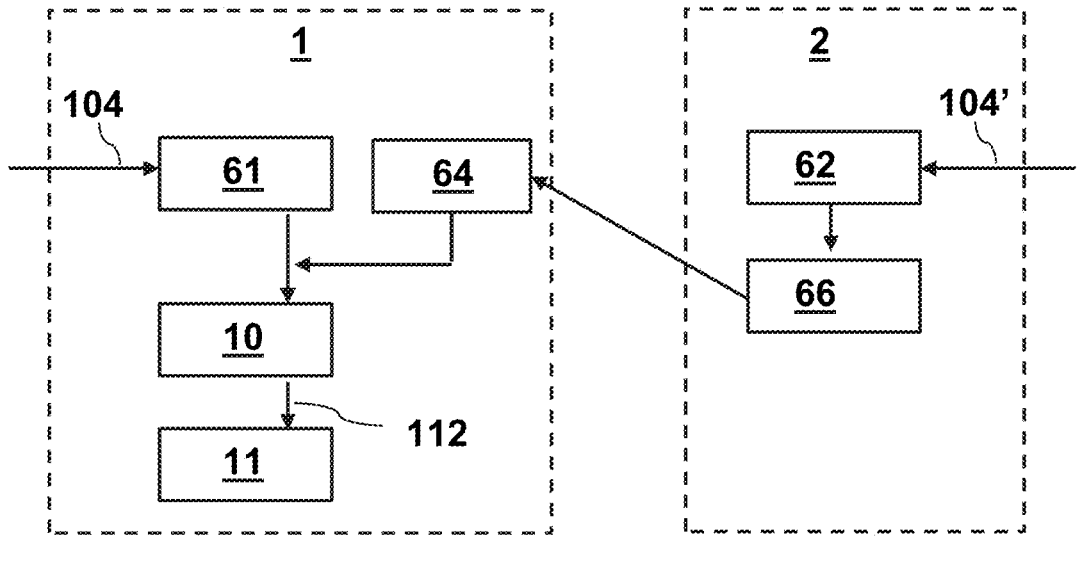
Fig. 4B
Fig. 4

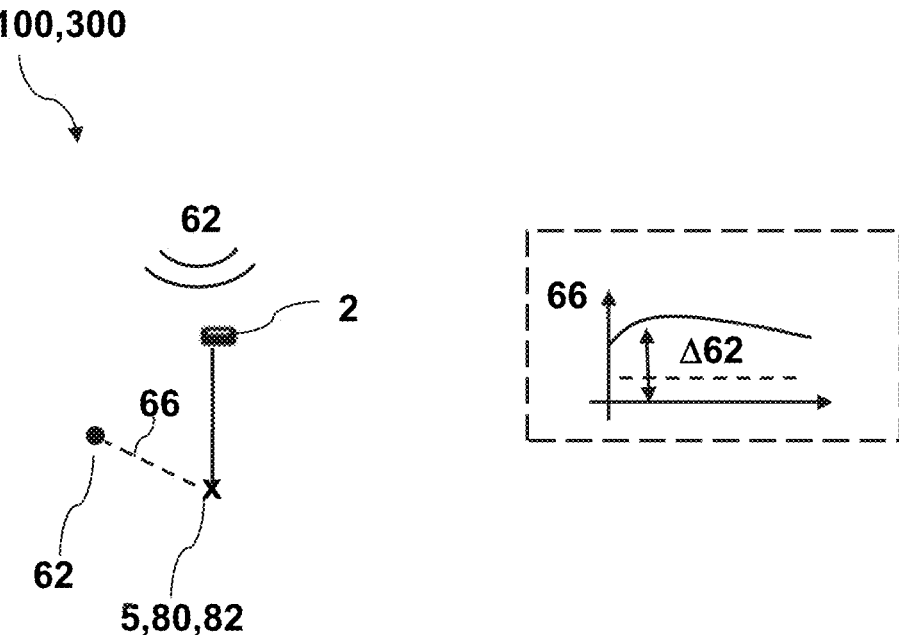
Fig. 8A
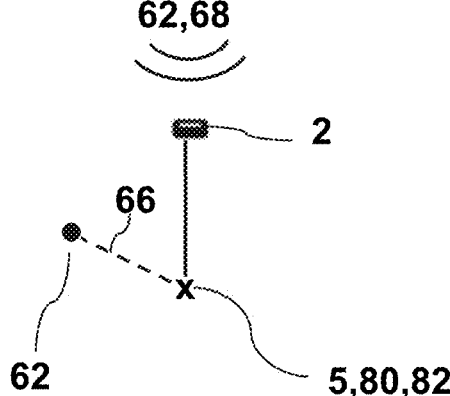
Fig. 8B
Fig. 8

METHOD FOR MARKING A GROUND SURFACE USING A ROBOT UNIT AND A LOCAL BASE STATION, THE SYSTEM THEREFORE AND USE THEREOF

CROSS-REFERENCE TO RELATED APPLICATIONS

This application is a continuation of U.S. application Ser. No. 17/051,191, which was filed Oct. 28, 2020, which claims priority to PCT Application No. PCT/DK2019/050135, having a filing date of May 2, 2019, which is based DK Application No. PA 2018 70263, having a filing date of May 2, 2018, the entire contents all of which are hereby incorporated by reference.

FIELD OF TECHNOLOGY

The following relates to a method for marking a ground surface according to a predefined marking pattern using a system comprising a robot unit and a local base station comprising acts of providing two flag points, receiving global positioning data of the robot unit using a robot GNSS receiver, receiving global positioning data of the local base station using a base GNSS receiver, and establishing a local base station position using the received global positioning data of the local base station. A method wherein the predefined marking pattern is arranged relative to the two flag point positions and wherein the local base station position is a system reference point of the system. The following relates furthermore to a system for marking a ground surface according to a predefined marking pattern and the use thereof or parts thereof.

BACKGROUND

In the recent years, pattern marking of ground surfaces has progressed to introducing the use of automatic operated vehicles or robots. However, still today an extensive use of manually operated vehicles exists. Typically, manually operated vehicles require operation by personnel during the whole marking and hence being labour-intensive. Manual mark-up has a number of drawbacks including a risk of uneven marking, especially with circular markings and the need for manual alignment of the pattern using manually positioned line marks, which further increases the labour burden.

The ground surfaces onto which pattern marking may be applied includes sports fields, parking lots and comparable units. The pattern marking often requires a high precision to comply with prescribed dimensions and may further have to be positioned relative to fixed units. The fixed units may be the outer boundaries of a parking lot, plants, goalposts in a sports field, spectator seats, fences etc.

Precision is even more important in the case of remarking of patterns which has faded but is still visible, to obtain clear-cut markings.

Robot units, operated using GPS signals, have been suggested, but they have been difficult to operate, not least because paint and orchid containers require monitoring and filling, and there is a risk that residues of paint or chalk in not completely drained containers will cure and thereby necessitates a comprehensive service of the device.

WO17063652A1 discloses a robot unit that is fast and easy to operate and where filling of paint can take place quickly and easily and where the paint is protected against oxygen up till the point of applying it to the ground surface. The robot unit navigates using GPS signals.

WO2014013415A1 discloses a method for marking a line and a system therefore comprising a line marking apparatus and a stationary base station. The line marking apparatus and a stationary base station provides for a differential GPS system. The line marking apparatus comprises a lateral adjustable marking head and a positioning system. In use, the positioning system determines the position of the marking head.

The line to be marked is presented by a mathematical model and by using the positioning system the line marking head may be continuously adjusted.

The aim of the disclosed system is to optimize the predicted mean line and the continuously update of the predicted mean line to reduce any zig-zag appearance of the marked lines. This also includes suggesting a preliminary line to be included in the predicted mean line to optimize the marking of the line from the starting point. For even better accuracy of the marked line, and hence less zig-zag appearance, additional positioning systems to be comprised in the line marking apparatus is suggested. This furthermore should make the system more stable in case of lost satellite communication.

The use of global navigation satellite systems (GNSS) such as GPS, GLONASS, Galileo, and BeiDou for position determination is performed using a GNSS receiver (or GPS receiver) which determines its position by measuring its distance to four or more global navigation satellites. An accuracy of the position determination down to a few meters may typically be achieved.

The limited accuracy is due to the technique using code phase measurement for determining the distance to the satellite, which may result in a few meters of error in the measurement of the distance to the satellite.

Another important source of error is ionospheric delay. The ionosphere slows the GNSS signals as they pass through it. This delay is hard to estimate and varies by time and location, leading to a few meters of error in the measurement of the distance to the satellite.

Real Time Kinematic (RTK) positioning is a satellite navigation technique used to enhance the precision of position determination using the GNSS signal. RTK positioning uses a more complicated phase measurements on the received GNSS signals for a more accurate distance determination to the satellite.

RTK systems have been developed which in addition to RTK positioning uses a base station which transmits a correction signal to the unit which position is to be determined. The unit receives its own GNSS signal and corrects this, according to the received correction signal for a more accurate position determination. There are several ways to transmit a correction signal from the base station to the unit. The correction signal is typically transmitted using RF signals in the UHF band. In most countries, certain frequencies are allocated specifically for RTK purposes. Most land survey equipment has a built-in UHF band radio modem as a standard option. RTK provides accuracy enhancements up to about 50-70 km from the base station, where the accuracy however may depend on the distance to the base station— also referred to as the baseline—where a shorter baseline may give a better accuracy.

The use of RTK systems allows the units to calculate their relative position with accuracy within millimetres, although their absolute position is accurate only to the same accuracy as the computed position of the base station. The typical nominal accuracy for these systems is 1 centimetre±2 mm per km in horizontal direction and 2 centimetres±2 mm per km in vertical direction.

This accuracy is generally perceived to limit the usefulness of the RTK technique to general navigation without high precision requirements and is therefore perceived as very suitable for surveying purposes, and where the use includes that the base station is located at a known surveyed location.

To extend the use of RTK systems to large areas, RTK networks are established containing a network of reference stations. Operational reliability and accuracy depend on the density and capabilities of the reference station network. A number of commercially operated RTK networks exist, which broadcast corrections, usually over an Internet connection. However, the reference stations are often sparsely distributed in limited areas limiting the benefit of RTK systems. Furthermore, even when using RTK positioning the accuracy of the resulting range measurement is essentially a function of the ability of the receiver's electronics to accurately process signals from the satellite, and additional error sources such as non-mitigated ionospheric and tropospheric delays, multipath, satellite clock and ephemeris errors, etc.

SUMMARY

One aspect is to achieve a line marking system with high accuracy, especially for remarking to obtain clear-cut markings. A further aspect is to achieve a system with high accuracy even in the case of no or limited cellular mobile communication coverage. Another aspect is to overcome the limitations in accuracy for systems operating in areas induced by no or limited access to a reference base station for geolocation or for areas where the baseline distance from the spot of operation to a reference base station for geolocation is of a distance bringing a high inaccuracy.

An aspect relates to a method for establishing a system reference point for marking a ground surface relative to which system reference point two flag point positions for a marking pattern on a ground surface and a driving route for a robot unit may be established. Establishing a system reference point may be effected with a local base station receiving global positioning data of the local base station using a base GNSS receiver. The global positioning data may be received from a subset of satellites. The robot unit may receive global positioning data of the robot unit using a robot GNSS receiver. The base GNSS receiver and the robot GNSS receiver may use a common subset of satellites from which they receive the global positioning data.

The global positioning data may generally be referred to as GPS coordinates and comprises a set of coordinates of a point in a geographic coordinate system. The global positioning data for the local base station and the robot unit are the positioning data of the respective GNSS receivers and hence a permanent internal correction may be incorporated in the local base station and the robot unit for establishing the point of the unit, used as position point of that unit.

The local base station may be a mobile base station.

The local base station position may be established as a point defined by a set of GPS coordinates. This set of GPS coordinates may be used as the system reference point in the method.

The local base station may estimate its current position without external dependencies (cellular data and reference network). This estimation may only be accurate down to around 1 meter.

However, as the base GNSS receiver and the robot GNSS receiver use a common subset of satellites from which they receive the global positioning data and based thereon position correction data may be derived. This may ensure that any of the inaccuracy in the global positioning data of the two receivers is correlated. An inaccurate system reference point may therefore be used while achieving accurate marking of a ground surface. This may be advantageous for establishing the system reference point in a short time while obtaining a system reference point providing accuracy for any later use of the system reference point for marking the ground surface.

An error in estimated position will not make the actual marking relative to the local base station less precise. The inaccuracy is only related to the coordinates of the local base station, which the robot uses as a basis for all the coordinates it gets from its own GNSS antenna, and thus a general offset in the range of a meter may arise, which can be corrected for within the system of the local base station and the robot unit.

In one embodiment the system reference point may be marked in the ground or on a fixed building structure for reuse of the established system reference point.

One effect of this embodiment may be that the exact same fixed reference point may be used for the local base station. This may achieve for an effective and accurate initialization of the system and/or method for marking the ground surface.

Repeating an accurate position may for example be achieved by mounting a sleeve driven into the ground.

An advantage of embodiments of the invention may be achieved by a method for marking a ground surface according to a predefined marking pattern using a system comprising a robot unit and a local base station comprising acts of providing two flag points, receiving global positioning data of the robot unit using a robot GNSS receiver, receiving global positioning data of the local base station using a base GNSS receiver, and establishing a local base station position using the received global positioning data of the local base station. The method may further comprise acts of establishing flag point position for each flag point, moving the robot unit according to a driving route for the robot unit comprising the predefined marking pattern, calculating a current position of the robot unit using the received global positioning data of the robot unit, and correcting moving direction of the robot unit according to the driving route using the calculated current position of the robot unit. A method wherein the predefined marking pattern may be arranged relative to the two flag point positions, wherein the local base station position may be a system reference point of the system relative to which system reference point, the flag point positions and the driving route for the robot unit are established, wherein the current position of the robot unit is calculated using the received global positioning data of the robot unit and position correction data from the local base station, and wherein the local base station communicates with the robot unit using a radio signal or a cellular data signal.

The local base station position may be the system reference point.

Thus alternatively, an advantage of embodiments of the invention may be achieved by a method for marking a ground surface according to a predefined marking pattern using a system comprising a robot unit and a local base station comprising acts of using a system reference point, providing two flag points, receiving global positioning data of the robot unit using a robot GNSS receiver and receiving global positioning data of the local base station using a base GNSS receiver.

The method may further comprise acts of establishing flag point position for each flag point, moving the robot unit according to a driving route for the robot unit comprising the predefined marking pattern, calculating a current position of the robot unit using the received global positioning data of the robot unit, and correcting moving direction of the robot unit according to the driving route using the calculated current position of the robot unit.

The predefined marking pattern may be arranged relative to the two flag point positions.

The system reference point may be an established system reference point achieved by the method for establishing a system reference point for marking a ground surface.

The current position of the robot unit may be calculated using the received global positioning data of the robot unit and position correction data from the local base station.

The local base station may communicate with the robot unit using a radio signal or a cellular data signal.

The global positioning data may generally be referred to as GPS coordinates and comprises a set of coordinates of a point in a geographic coordinate system. The global positioning data for the local base station and the robot unit are the positioning data of the respective GNSS receivers and hence a permanent internal correction may be incorporated in the local base station and the robot unit for establishing the point of the unit, used as position point of that unit.

The local base station may be a mobile base station, which may be moved for each pattern marking to be performed or be used in one position for marking several patterns. The base station may also be installed as part of a stationary network. The local base station may be used with a tripod, a pole or any other suitable means. The means should accommodate a stable construction keeping the base station stationary during use for marking.

The flag points may be provided as physical flag points, as coordinates on a map or global positioning data provided by external technical means including mobile smart devices. Furthermore, the flag points may be derived from a single point in combination with a direction or a vector. In yet a further aspect additional flag points may be used, where this may be beneficial.

The local base station position may be established as a point defined by a set of GPS coordinates. This set of GPS coordinates may be used as the system reference point in the method. Any inaccuracy in the GPS coordinates of the local base station position will thus become a general inaccuracy or offset of the method. Hence, as the other positions in the method are established relative to this system reference point any inaccuracy in the system reference point will not influence the accuracy of the marking of the predefined pattern performed with the method.

The base GNSS receiver and the robot GNSS receiver may use a common subset of satellites from which they receive the global positioning data and based thereon position correction data may be derived. This can ensure that any of the inaccuracy in the global positioning data of the two receivers is correlated. One effect of using a set single position during the mark-up achieved by use of the local base station, in combination with the moving robot unit performing the mark-up may be that any inaccuracy emerging in the global positioning data during the mark-up can be corrected for. Thus, the use of a local base station may increase the internal accuracy of the method and thus the marking of the ground surface.

The mode of internal communication between the local base station and the robot unit may depend on local factors present at the location where the robot unit is used and the distance (or baseline) between the local base station and the robot unit. In case, a stable cellular internet connection cannot be established, it may be recommended to use radio signals. In case a stable cellular internet connection can be established, cellular data signals may be used which may increase the operating distance of or baseline of the base station. Cellular data signals may also be used in case of physical obstacles in the line of sight between the local base station and the robot unit which hinders radio communication. Advantageously radio signals may be used for short range communication (short baseline). Radio signals may be transmitted through physical obstacles for short baseline communication for operation with a longer baseline, the line of sight between the local base station and the robot unit should be substantially unhindered by physical obstacles. Alternatively, a repeater may be used for radio communication to overcome deficiencies caused by physical obstacles in the line of sight.

Further considerations for the mode of internal communication between the local base station and the robot unit could include the common practice of using priority in cellular communication systems, which may cause a low update frequency of the correction data. This frequency may be evaluated in connection with the speed of the robot unit during marking operation. Thus, a low update frequency in combination with a high speed may increase the risk of inaccurate marking.

Thus, the position of the local base station and the mode of communication may be mutually dependent and chosen accordingly.

The use of two GNSS receivers, one on each unit, using a common subset of satellites, and which units communicate position correction data may increase both the reliability and accuracy of the position determination and may further achieve that an inaccurate position determination may give rise to an offset of the complete system, which do not influence the accuracy within the system and hence the method. Furthermore, the direct communication between the local base station and the robot unit may be performed with a chosen frequency sufficient for the present task to be performed. The update frequency may be adjusted according to the speed by which the robot unit is operated and the pattern to be marked. Also, in this case the update frequency, the speed of the robot unit and the complexity of the pattern may be mutual dependent and chosen accordingly for achieving a sufficient quality of the performed marking.

In one aspect the global positioning data may be received by the GNSS receiver at a frequency of 10 Hz. In other aspects the global positioning data may be received with lower time intervals or at higher time intervals depending on the operation.

The position correction data communicated from the local base station to the robot unit may be communicated at a different frequency e.g. 1 Hz. The time intervals with which data is communicated in the method may be adjusted to an operation of the system.

Setting up a local base station and using it with a robot exposes challenges compared to using a reference network base station in an external reference network, where the reference network base station is mounted in a fixed position that will never change. When you connect to a reference network you are able to get a "known position" (a position at centimetre accuracy) because i) the physical position of the reference network base station never changes and ii) the reference network base station has been configured with a fixed point, which may be regularly calibrated.

To achieve an efficient use of the robot with the local base station, the local base station may generate a global "known position". This may be obtained from a reference network. Hence the system reference point may be established by a global reference point in the geographic coordinate system (GPS coordinate system), which may be comparable to the use of a reference network base station.

The local base station may be used in different operation modes depending on the accuracy to be achieved for the marking. Below three operation modes are described.

Single Use Operation

In this operation mode, the local base station will estimate its current position when powering on. It uses no external dependencies (cellular data and reference network). As this estimation can only be accurate down to around 1 meter, it is only recommended if doing work that is not intended to be reused, such as doing a demonstration or marking fields for a one-time event. Because of the inaccuracy of this operation, all coordinates registered in the system can shift based on the error in estimated position of the local base station if the base GNSS receiver is restarted.

This error in estimated position will not make the actual marking relative to the local base station less precise. The inaccuracy of this operation is only related to the coordinates the local base station can obtain during power on, which the robot uses as a basis for all the coordinates it gets from its own GNSS antenna, and thus a general offset in the range of a meter may arise.

Saved Position Operation

This operation may be in most cases, as it uses no external dependencies (cellular data and reference network). This operation is similar to the "Single Use operation", but may use an extra feature of saving the estimated position of the local base station. This may achieve for, that the same position can be recalled each time the system is set up at that physical position. One requirement for this operation mode to work effective and accurate may be that the local base station is placed in the exact same position each time. Repeating an accurate position may be achieved by mounting the base station on a prism pole and installing the pole in a sleeve driven into the ground. A regular tripod may also be used, if only it is possible to repeat that exact same position.

Auto Mode Operation

This operation can improve the ease of use of the local base station, as it enables the operator to freely position the local base station on the field without having any information available about its position. In this operation mode, the position information may be obtained by connecting to a reference network to get a precise and "known position". Two requirements for this operation mode to work efficiently and accurate may be that a working data connection can be established, and that a reference network station is located within a distance of up to 50 kilometres (~30 miles) or possibly further under ideal circumstances.

The 'Saved position operation' and 'Auto mode operation' achieves for setting a global 'known position' being a global reference point. Thereby an exact position (at centimetre level) of the local base station is achieved which may be a requirement for performing a precise remarking of a marked pattern with the robot unit—this may often be the same as replicating a previously driven route of the robot unit around the field. The achieved accuracy is achieved due to a general offset of the system and hence the internal reference position and distances are relative to each other within the system.

The use of the local base station can be improved by an optimal mounting of the local base station.

In general, the use may be optimized by ensuring a clear view of the sky and by placing it away from tall obstacles (a sufficient distance may be 20 meters/60 feet away from such. Furthermore, use may be optimized by levelling the base station horizontal to mitigate the risk of cutting off satellites that would otherwise be visible to the local base station.

To achieve an effective and accurate remarking with the robot unit, one way to ensure an exact replacement of the local base station may be to level the base station horizontal each time it is set up. Introducing a tilt in the base station between the repeated use may introduce a few centimetres of error from marking to marking, if the system is used in 'Saved position operation'. This does not apply to Single Use and Auto Mode.

A tripod may be suitable for all three described operation modes: Auto Mode, Saved position and Single Use. The tripod can be positioned at any position and on most ground surfaces. However, in 'Saved position operation', a position that makes it easy to precisely reposition the tripod should be used. The repositioning may be ensured by for example establishing a marking for each leg of the tripod on the ground, using one or more "monuments" in the ground to mark the positions of the legs, marking the centre of the tripod with a cord hanging down from its centre, placing the leg(s) of the tripod up against a fence or another advantage that cannot be moved. These are merely examples and should be read as such.

A prism pole may be used with a stationary mounted sleeve. This helps to ensure a precise repositioning of the local bases station. A prism pole in combination with a stationary mounted sleeve may be especially useful for 'Saved Position operation'. The sleeve should be chosen to fit tightly around the prism pole to achieve an optimal accuracy for the repositioning as any variation will translate directly to the lines on the field. A suitable ratio of pole length versus sleeve depth may be in the range 2:1 or 4:1 to avoid curving of the pole.

The local base station may alternatively be mounted in a stationary fixed position. This achieves that the device may be connected to a power outlet to enable continuous operation. A stationary fixed position may be suitable when used on larger complexes if it can be mounted at a central location onsite (at a high location).

In one aspect the local base station may be adapted to connect to an external antenna which may be stationary mounted in a suitable place e.g. the base station may be placed in a shed with the external antenna placed on the rooftop.

A further advantage of embodiments of the invention may be achieved with the method wherein the position correction data from the local base station are transmitted to the robot unit, which position correction data comprise global position data corrections and wherein the act of calculating the current position of the robot unit is performed by the robot unit.

In one aspect the correction of the robot unit's movement may be derived by the local base station and the robot unit may be operated by continuously receiving operation directions from the local base station. In another aspect the robot unit may derive the corrections itself based on received position correction data from the local base station.

The position correction data may comprise calculated deviations between a calculated route and a calculated position of the robot unit and thus the robot unit may simply receive position correction data to operate accordingly. This differs from the alternative method of using position correction data comprising the global position data corrections, where the robot unit may perform the calculation and adjustments internally. In this case, the robot unit may comprise data of the predefined pattern, the driving route and/or other data.

One effect of transmitting the position correction data to the robot unit may be that the robot unit itself derives corrections to its movement. This may have the advantage that the robot unit holds its own driving route and only corrects this, if a change in position correction data is received. This may reduce the requirement to the transfer of data to mainly a one way communication from the local base station to the robot unit.

The predefined pattern may typically be embedded in a memory element. This memory element may be comprised in the robot's controller, on an external device or in the local base station. Various patterns may be loaded from an external device, such as a computer to the robot unit. Alternatively, part of the controller's functionality may be embedded in an external device such as a computer, which the robot unit is in continuous contact with, for example through a radio connection such as via WiFi, WPAN (BlueTooth, NFC) or corresponding RF protocol.

In a further aspect, a driving route used for marking a given predefined pattern may be stored in relation to this predefined pattern. In line with the aspects described above for the predefined pattern these may also be applicable for the driving routes.

Yet a further advantage of embodiments of the invention may be achieved with the method comprising a further act of receiving global positioning data of the local base station from a network of one or more external reference base stations.

The external reference base station may be stationary mounted and hence, the additional global positioning data may comprise 'known positions' in the geographic coordinate system. Furthermore, the external reference base stations may be regularly calibrated.

One effect of this embodiment of the method may be an improved position determination of the local base station, which may achieve for an increased accuracy of the system.

A further effect may be an increased access to global positioning data which may improve the robustness of the method in regard to improved accuracy and improved redundancy of the system.

Yet a further aspect of embodiments of the invention may be achieved with the method wherein the act of establishing the local base station position using RTK positioning and the act of receiving global positioning data of the local base station is performed using a base RTK GNSS receiver. The local base station position may be the system reference point.

In one aspect the robot without a local base station and then instead connect to a third-party reference network provider to obtain RTK (Real Time Kinematic) corrections, however, requires an internet connection.

In one aspect, a robot unit may be used without a local base station and instead connecting the robot unit to a third-party reference network provider to obtain RTK (Real Time Kinematic) connection. This however may require an internet connection between the RTK reference network and the robot unit. Thus, one effect of using a local base station with the RTK positioning may achieve for operating the system using none, a limited or even an unstable data connection while still achieving a high precision system.

A further effect may be that the distance between the robot unit and the local base station may be adjusted to the individual task. Today, RTK reference networks are sparsely available and even those that are available may only comprise sparsely spread reference stations resulting in distances between the robot unit and a reference station being too long, these drawback may be overcome by use of the local base station.

Thus, as previously described, a robust method for precision marking may be achieved with high accuracy and a high level of redundancy.

Yet a further aspect of embodiments of the invention may be achieved with the method, wherein the flag point and the driving route of the robot unit is located within a distance of the local base station of 20 km, 5 km, or 2 km.

The use of radio signals may provide for a limited working distance of the system between the local base station and the robot unit. Using UHF may limit the working distance to about 2 kilometres whereas a working data connection will allow a single base station to cover a radius of 10-15 kilometres.

One effect of the limited working distance may be that the typical nominal accuracy for systems using RTK positioning is 1 centimetre±2 mm per km in horizontal direction. Thus, a working distance of above 20 km may induce an inaccuracy of up to 5 cm but typically the inaccuracy is much lower.

Yet a further aspect of embodiments of the invention may be achieved with the method, wherein the act of establishing the local base station position is performed using a fixed global reference point. The local base station position may be the system reference point.

As previously discussed, setting up a local base station and using it with a robot exposes challenges compared to using a reference network base station in an external reference network, where the reference network base station is mounted in a fixed position that will never change. However, with this embodiment, these challenges may be met as the system reference point may be established as a global reference point in the geographic coordinate system (GPS coordinate system) and thus the disclosed method may be comparable to the use of a reference network base station.

In one embodiment of the method, connector means or a connector(s) may be provided at the fixed global reference point. The connector means or connector may be adapted for cooperating with a matching connector of the local base station with the base GNSS receiver.

One effect of this embodiment may be that the exact same fixed reference point may be used for the local base station. This may achieve for an effective and accurate initialization of the system and/or method for marking the ground surface.

Repeating an accurate position may for example be achieved by mounting a sleeve driven into the ground. The sleeve could be chosen to fit tightly around the prism pole to achieve an optimal accuracy for the repositioning as any variation will translate directly to the lines on the field. A suitable ratio of pole length versus sleeve depth may be in the range 2:1 or 4:1 to avoid curving of the pole.

In one embodiment of the method, the system reference point may be saved for reuse for remarking the ground surface.

One effect of this embodiment may be that the method presents a number of suggested system reference point. Furthermore, a recommended system reference point may be suggested. This recommended system reference point may be the point being closest to the point given by the global positioning data received by the local base station. This may ease the use of the method and the system and reduce the risk of choosing the wrong system reference point.

Embodiments of the present invention relate to different aspects including the methods described above. Other aspects include the system and the use of such a system or parts of the system. Each aspect yielding one or more of the effects and advantages described above just as one aspect may have embodiments corresponding to embodiments described for another aspect (method, system and/or use).

An aspect of embodiments of the invention may be achieved by a system comprising a local base station comprising a base communication unit and a base GNSS receiver configured for receiving global positioning data from multiple satellites, and a robot unit configured for marking a ground surface according to a predefined marking pattern comprising a controller, a robot communication unit and a robot GNSS receiver configured for receiving global positioning data from multiple satellites. A system, which comprises a base communication unit and robot communication unit may be configured for communicating from the base communication unit to the robot communication unit using at least one signal type chosen amongst the group of: radio signal and cellular data signal.

The system may comprise means adapted to execute the steps of the method for establishing a system reference point. The system may comprise means adapted to execute the steps of the method for marking a ground surface.

The multiple satellites for the local base station and for the robot unit may form a common subset of satellites.

In one aspect, the base communication unit may comprise a radio modem and the robot communication unit may comprise a RF antenna, for using a radio signal for communication. In another aspect, both the base communication unit and the robot communication unit may comprise a SIM card for using a cellular data signal for communication. In yet a further aspect, the communication units may comprise a combination of means to support the use of both radio signals and cellular data signals for communication.

This embodiment may further support the effects and advantages of the method for marking a ground surface according to a predefined marking pattern and thus the effects and advantages of this embodiment may be in line with those described in relation to the method and the embodiments thereof.

A further aspect of embodiments of the invention may be achieved by the system, wherein the local base station comprises a base RTK GNSS receiver configured for receiving global positioning data from multiple satellites and from a network of one or more external reference base stations.

This embodiment may further support the effects and advantages of the method for marking a ground surface according to a predefined marking pattern wherein the act of establishing the local base station position using RTK positioning is performed and thus the effects and advantages of this embodiment may be in line with those described in relation to the method and the embodiments thereof.

An aspect of embodiments of the invention may be achieved by a computer program product (non-transitory computer readable storage medium having instructions, which when executed by a processor, perform actions) comprising instructions to cause the system comprising the local base station and the robot unit to carry out the steps of any one of the methods for establishing the system reference point, for marking the ground surface or both.

This embodiment may support the effects and advantages of the methods for establishing the system reference point, for marking the ground surface or both as described above.

An aspect of embodiments of the invention may be achieved by a computer-readable medium having stored thereon the computer program product.

This embodiment may support the effects and advantages of the methods for establishing the system reference point, for marking the ground surface or both as described above.

One computer-readable medium may be connected to the robot unit, to the local base station, an external computer, or any combination hereof.

The instructions to be carried out may be comprised in or output from the algorithms, in a computer program product comprising one or more of the method acts or a combination hereof.

An aspect of embodiments of the invention may be achieved by use of the system for marking a ground surface according to a predefined marking pattern arranged relative to two flag points.

This embodiment may further support the effects and advantages of the method for marking a ground surface according to a predefined marking pattern and thus the effects and advantages of this embodiment may be in line with those described in relation to the method and the embodiments thereof.

A further advantage of embodiments of the invention may be achieved by the use of the system, wherein the flag point and the marking of the predefined marking pattern to be performed is located within a distance of the local base station of 20 km, 5 km, or 2 km.

This embodiment may further support the effects and advantages of the method for marking a ground surface according to a predefined marking pattern and thus the effects and advantages of this embodiment may be in line with those described in relation to the method and the embodiments thereof.

The use of radio signals may provide for a limited working distance of the system between the local base station and the robot unit. Using UHF may limit the working distance to about 2 kilometres whereas a working data connection will allow a single base station to cover a radius of 10-15 kilometres.

One effect of the limited working distance is that the typical nominal accuracy for systems using RTK positioning is 1 centimetre$\pm$2 mm per km in horizontal direction. Thus, a working distance of above 20 km may induce an inaccuracy of up to 5 cm. A method resulting in an inaccuracy above 5 cm may not be useable for the purpose of this disclosure.

A further advantage of embodiments of the invention may be achieved by use of the local base station or the robot unit of the system for establishing two flag point positions relative to which a predefined marking pattern is to be arranged.

This embodiment may further support the effects and advantages of the method for marking a ground surface according to a predefined marking pattern and thus the effects and advantages of this embodiment may be in line with those described in relation to the method and the embodiments thereof.

A further advantage of embodiments of the invention may be achieved by use of the method for establishing a system reference point for establishing a system reference point to be saved for reuse.

One effect of this embodiment may be that the exact same fixed reference point may be used for the local base station. This may achieve for an effective and accurate initialization of the system and/or method for marking the ground surface.

Another effect of this embodiment may be that the method for marking a ground surface may present a number of suggested system reference point. Furthermore, a recommended system reference point may be suggested. This recommended system reference point may be the point being closest to the point given by the global positioning data received by the local base station. This may ease the use of the method and the system and reduce the risk of choosing the wrong system reference point.

In one aspect the robot unit may be of the type disclosed in WO17063652A1 for painting stripes on a playing surface such as grass, gravel, ice, or synthetic material field, which robot unit comprises a controller, a GPS receiver, a reservoir for marking material, at least one spraying nozzle for applying the marking material controlled by signals from a controller.

BRIEF DESCRIPTION

Some of the embodiments will be described in detail, with references to the following Figures, wherein like designations denote like members, wherein:

FIG. 4 illustrates two embodiments of the method;

FIG. 8 illustrates an example of an inaccuracy in the global position data of the local base station position leading to a general offset in the method.

| List of reference symbols | |
|---|---|
| No. | Item |
| 1 | Robot unit |
| 2 | Local base station |
| 5 | Fixed global reference point |
| 6 | Global navigation satellite |
| 7 | Ground surface |
| 8 | Driving route |
| 9 | Predefined marking pattern |
| 10 | Position of the robot unit |
| 11 | Moving direction of the robot unit |
| 12 | Robot GNSS receiver |
| 14 | Robot communication unit |
| 16 | Controller |
| 18 | RF antenna |
| 22 | Base GNSS receiver |
| 22' | Base RTK GNSS receiver |
| 24 | Base communication unit |
| 26 | Radio modem |
| 50 | Local communication connection |
| 52 | Radio signal |
| 54 | Cellular data signal |
| 56 | SIM card |
| 61 | Global positioning data |
| 62 | Global positioning data |

-continued

| List of reference symbols | |
|---|---|
| No. | Item |
| 64 | Position correction data |
| 66 | Global position data corrections |
| 68 | RTK positioning data |
| 70 | Flag point |
| 72 | Flag point position |
| 80 | System reference point |
| 82 | Local base station position |
| 90 | External reference base station |
| 100 | Method |
| 102 | Providing |
| 104 | Receiving |
| 104' | Receiving |
| 106 | Establishing |
| 108 | Moving |
| 110 | Calculating |
| 112 | Correcting |
| 120 | Using |
| 180 | Computer program product |
| 182 | Computer-readable medium |
| 200 | System |
| 300 | Use |

DETAILED DESCRIPTION

Figure 1:
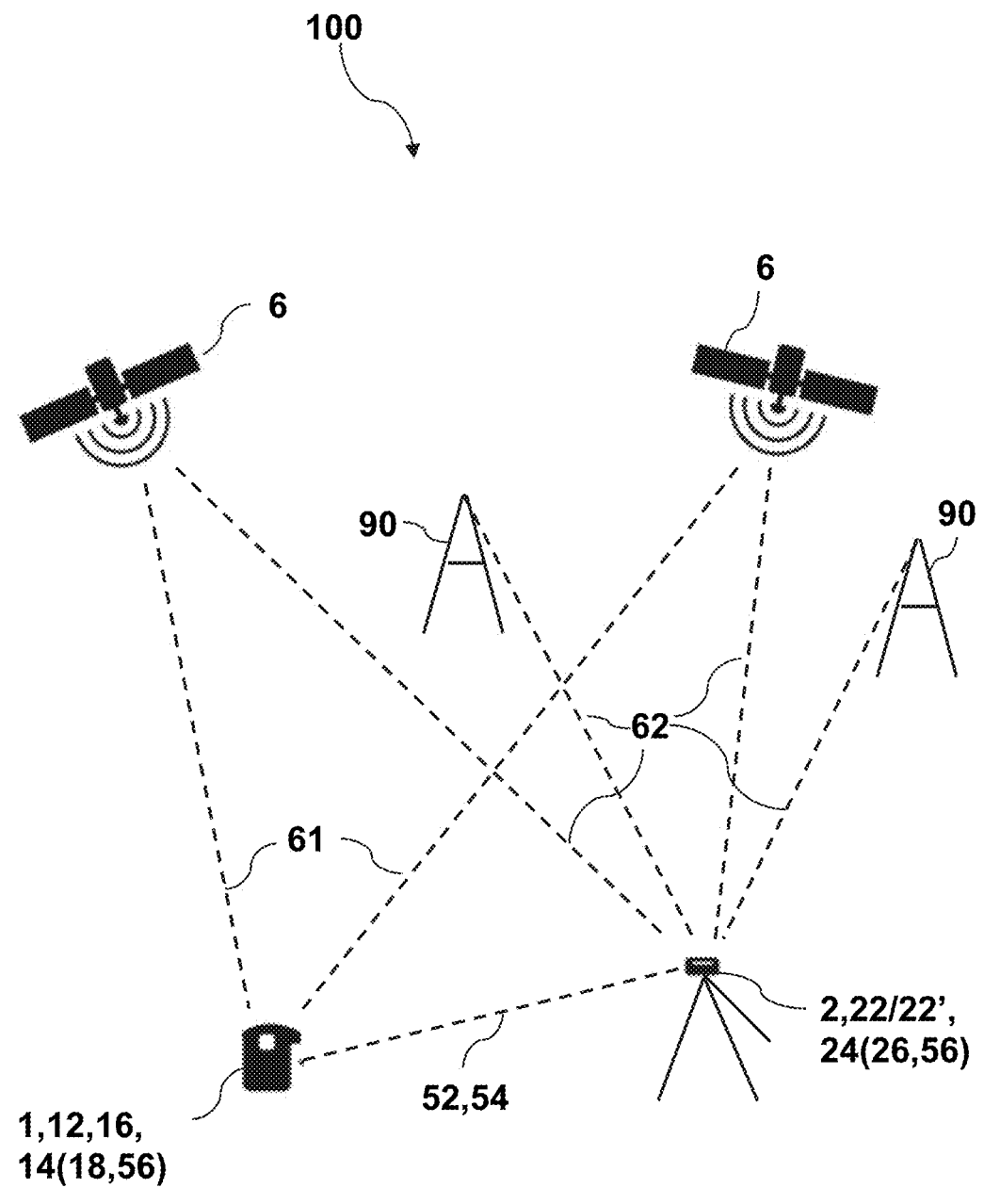
FIG. 1 illustrates communication connections to be used with the system.

FIG. 1 illustrates the communication connections which may be used in the method 100. The communication lines for both the robot unit 1 and the local base station 2 are illustrated. The robot unit 1 comprises a Robot GNSS receiver 12, a robot communication unit 14 and a controller 16. The robot unit 1 receives global positioning data 61 of the local robot unit 1 from multiple global navigation satellites 6 using the robot GNSS receiver 12. In the illustrated embodiment only two global navigation satellites 6 are illustrated for simplicity. The local base station 2 comprises a base GNSS receiver 22 or a base RTK GNSS receiver 22' and a base communication unit 24. The local base station 2 also receives global positioning data 62 from multiple global navigation satellites 6. Furthermore, the local base station 2 may receive global positioning data 62 from a network of one or more external reference base stations 90.

The local base station 2 communicates with the robot unit 1 using a radio signal 52 or a cellular data signal 54. The base communication unit 24 may comprise a radio modem 26 and the robot communication unit 14 may comprise a RF antenna 18 communicating using a radio signal 52. The base communication unit 24 and the robot communication unit 14 may both comprise a SIM card 56 for communicating using a cellular data signal. To enable both protocols for communication the communication units 14, 24 may comprise a combination of means to support the use of both radio signals 52 and cellular data signals 54.

Figure 2:
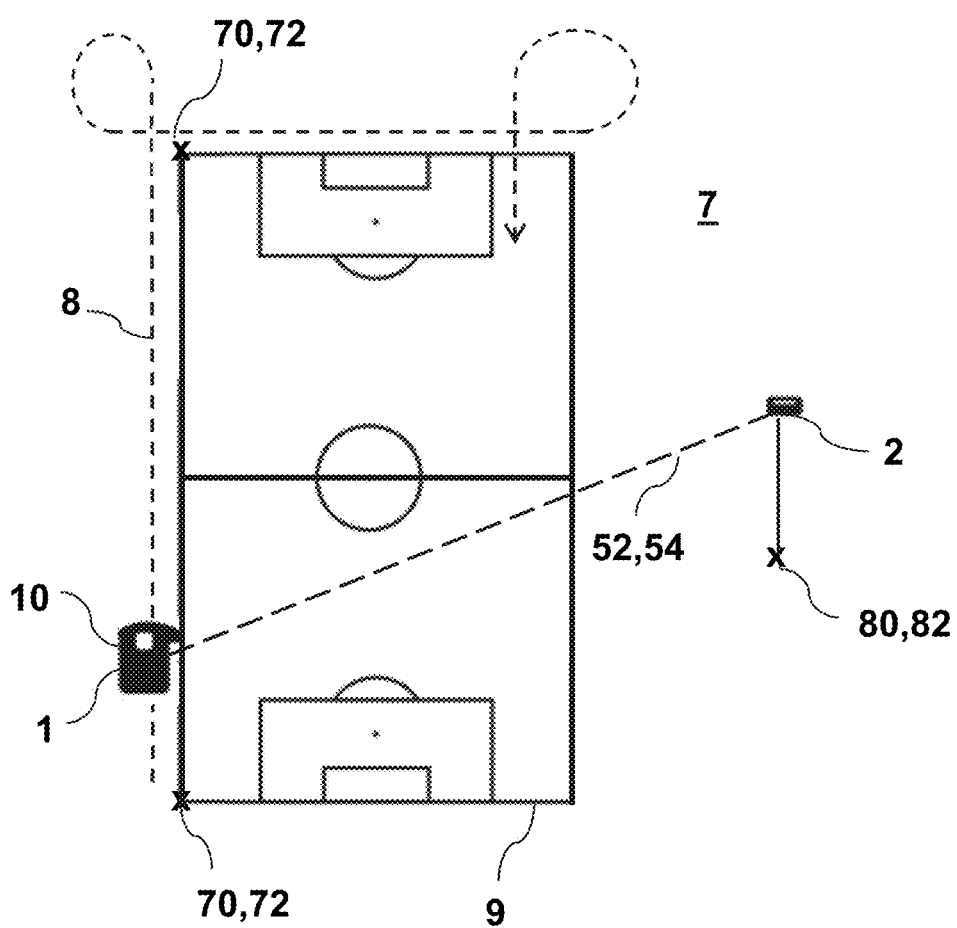
FIG. 2 illustrates one embodiment of the method, the system and the use.

FIG. 2 illustrates one embodiment of the method 100, the system 200 and the use (300) of the system and the method. The robot unit 1 moves according to a driving route 8 performing the marking of a predefined marking pattern 9 on a ground surface. Only part of the driving route 8 is illustrated for simplicity. In the illustration the predefined pattern 9 is a soccer field which is illustrated as already marked. The predefined pattern 9 is arranged according to two flag points 70. The local base station 2 with a local base station position 80 communicates with the robot unit 1 using a radio signal 52 or a cellular data signal 54.

The local base station position 82 is set as the system reference point 80 relative to which, the position 72 of the flag points 70 are established. The position of the robot unit 1 is a calculated current position 10, which is calculated using the received global positioning data of the robot unit 1 and position correction data from the local base station 2.

Figure 3:
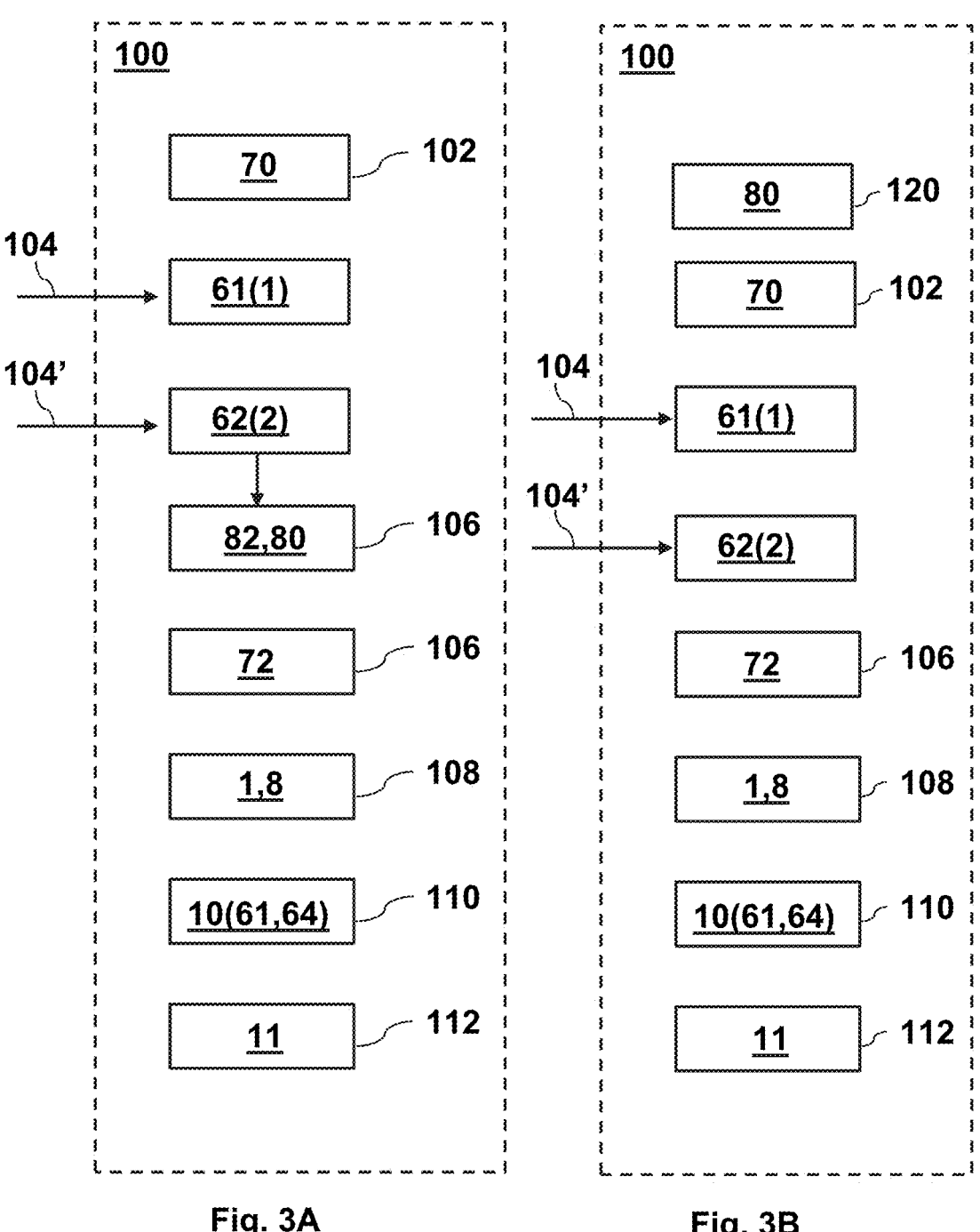
FIG. 3 illustrates two embodiments of the method.

FIG. 3 illustrates the acts comprised in two embodiments of the method 100 for marking a ground surface according to a predefined marking pattern. In the method two flag points 72 are provided 102 relative to which the predefined marking pattern is arranged. Two acts of receiving 104,104' global positioning data 61,62 are performed, as both the robot unit 1 and the local base station 2 receives 104,104' their independent global positioning data 61,62.

In the embodiment illustrated in FIG. 3A, a local base station position 82 is established 106 based on the received 104' global positioning data 62 by the local base station 2. The local base station position 82 is set as a system reference point 80 for the whole system.

Alternatively, in the embodiment illustrated in FIG. 3B, a previously established system reference point 80 is used.

Relative to the system reference point 80 the flag point position 72 for each flag point 70 is established 106. The robot unit 1 may now move 108 according to a driving route 8 for the robot unit 1. By calculating 110 a current position 10 of the robot unit 1 and correcting 112 the moving direction 11 of the robot unit 1 according to the driving route 8 and by using the calculated current position 10 the marking of the ground surface according to a predefined marking pattern may be performed.

FIG. 4 illustrates two embodiments of the method 100 for marking a ground surface according to a predefined marking pattern. FIG. 4A illustrates that the global position data 61 received 104 by the robot unit 1 is transmitted to the local base station 2. The local base station further receives 104' the global position data 62 for its own position and derives position correction data 64. The position correction data 64 and the global position data 61 of the robot unit 1 is used for calculating the position 10 of the robot unit 1 and the robot unit may perform a correction 112 of the moving direction 11 according to the driving route.

FIG. 4B illustrates that the local base station receives 104' the global position data 62 for its own position and derives global position data corrections 66. The global position data corrections 66 are transmitted to the robot unit 1, which encompasses these data as position correction data 64 for calculating its own current position 10 in combination with the global position data 61 of the robot unit 1 received by the robot unit 1 itself. The robot unit may then perform a correction 112 of the moving direction 11 according to the driving route.

Figure 5:
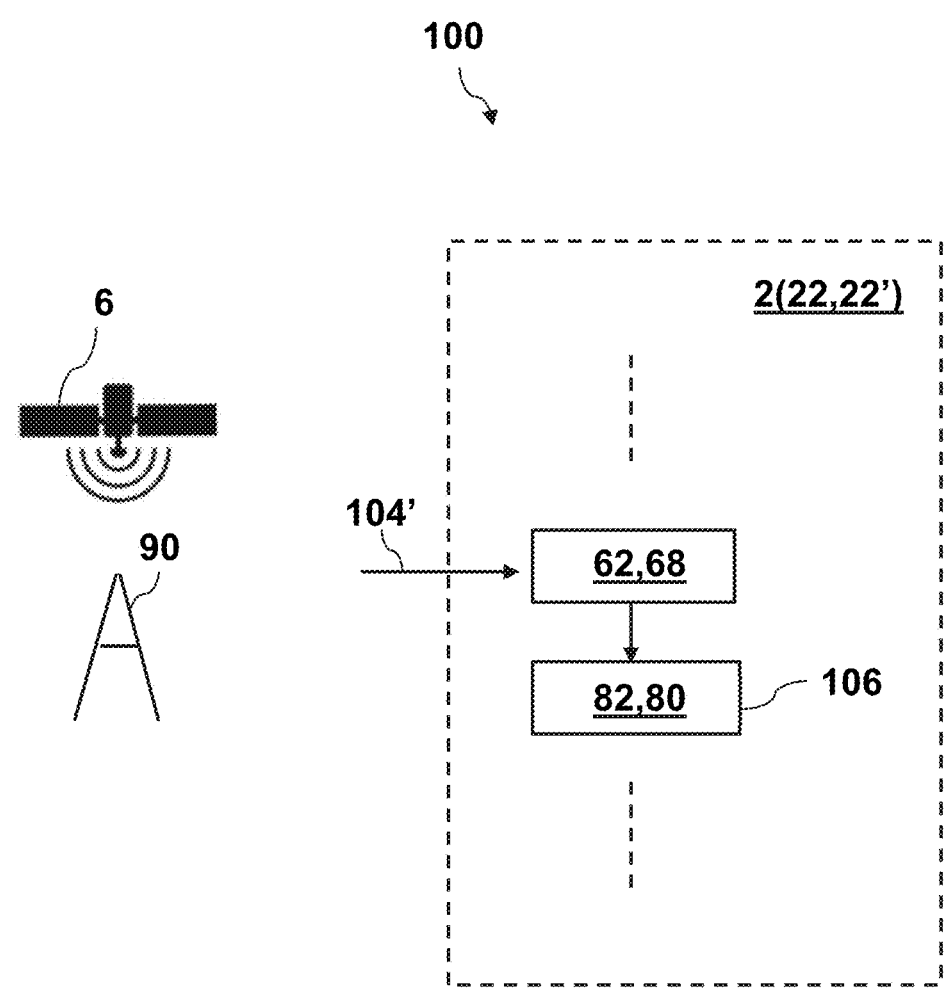
FIG. 5 illustrates one embodiment of the method with acts of receiving global positioning data from a reference network.

As illustrated in FIG. 5 the illustrated embodiments of the method 100 for marking a ground surface according to a predefined marking pattern in FIGS. 3 and 4 may in addition to receiving 104' global positioning data 62 of the local base station 2 from multiple global navigation satellites 6 further receive 104' global positioning data 62 of the local base station 2 from a network of one or more external reference base stations 90.

Alternatively or in addition thereto, the illustrated embodiments of the method 100 for marking a ground surface according to a predefined marking pattern in FIGS. 3 and 4 may in addition to receiving 104' global positioning data 62 of the local base station 2 from multiple global navigation satellites 6 further receive 104' RTK position data

68 for establishing 106 the local base station position 82. The RTK position data 68 is receiving 104' using a base RTK GNSS receiver 22'.

Figure 6:
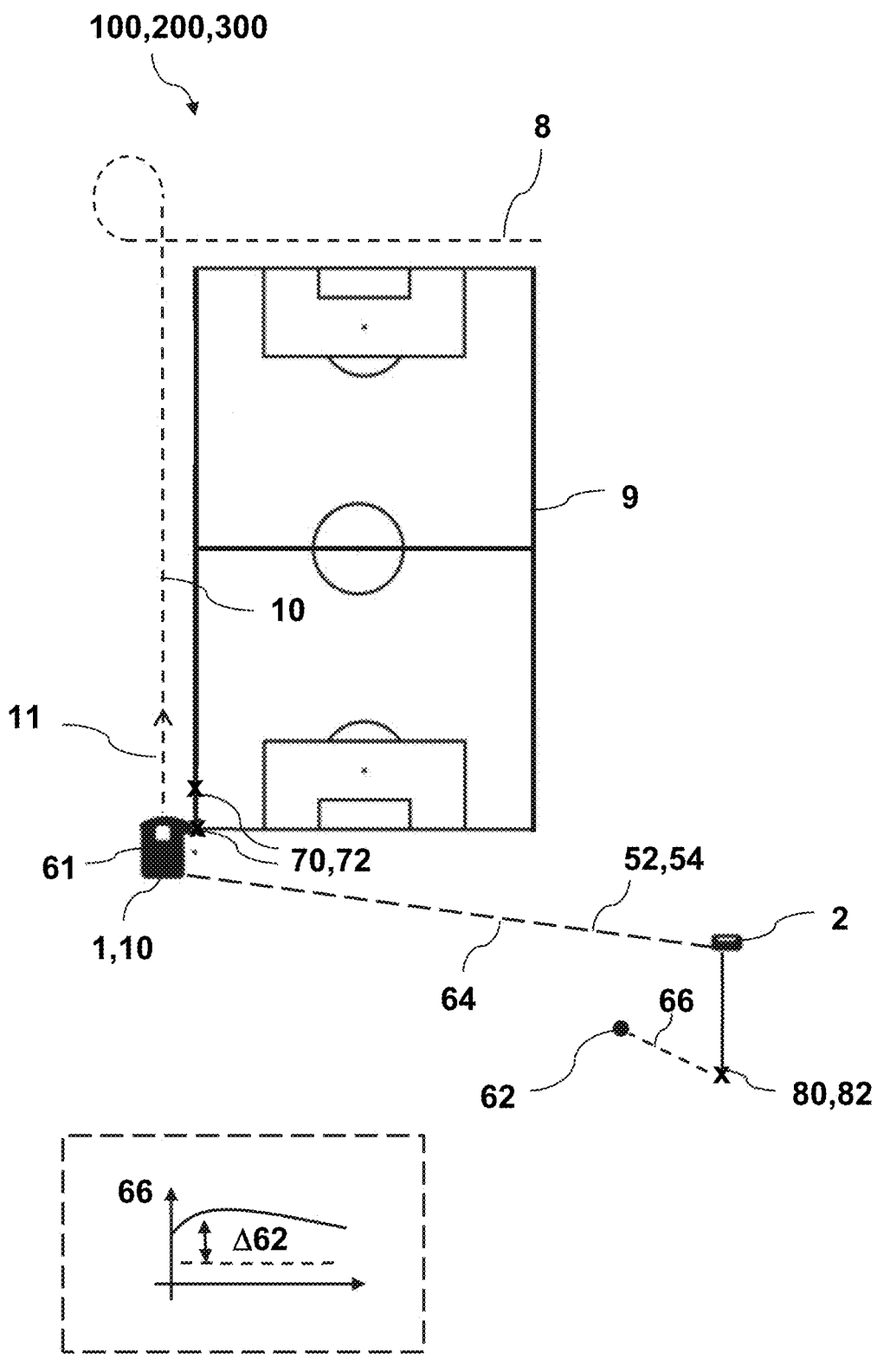
FIG. 6 illustrates an example of an inaccuracy in the global position data of the local base station position leading to a general offset in the method.
Figure 7:
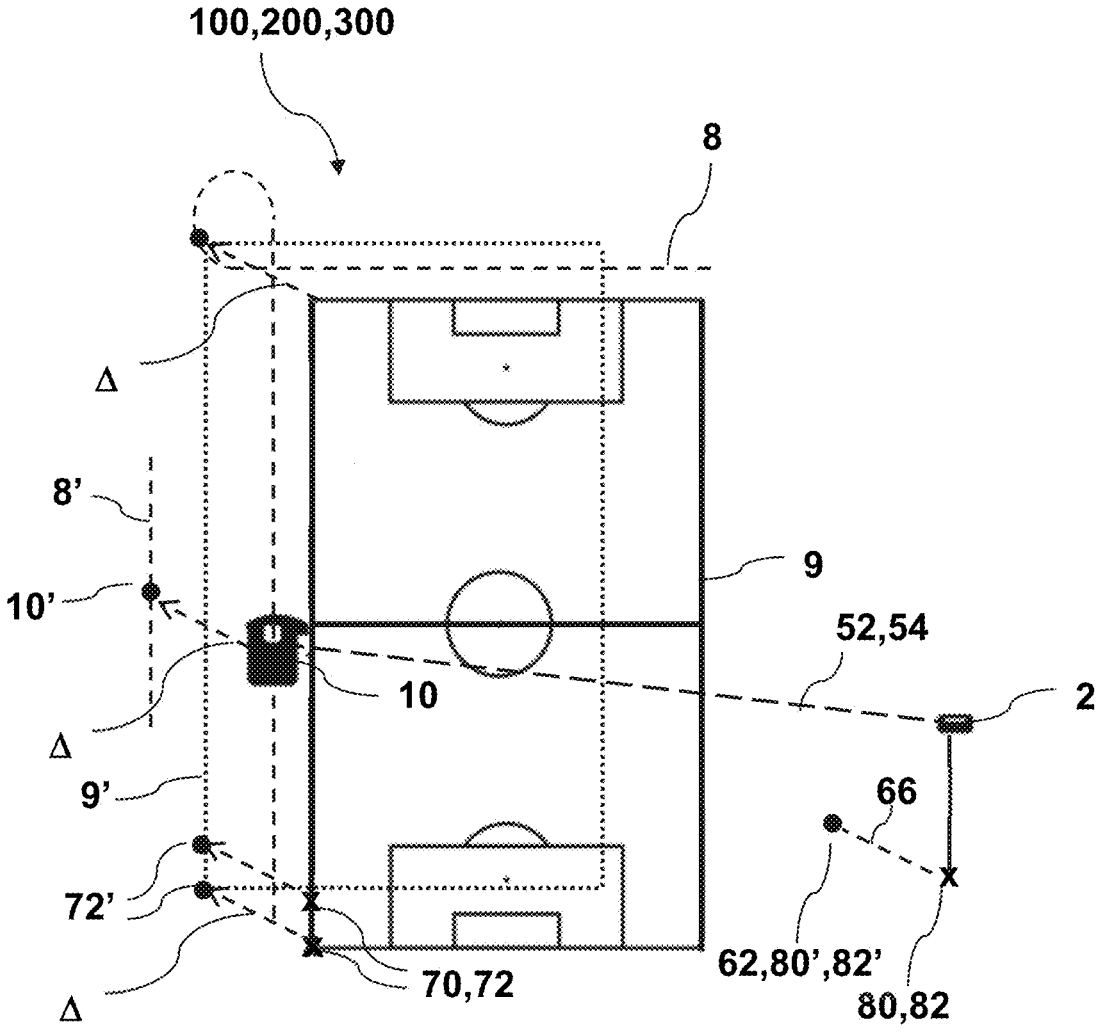
FIG. 7 illustrates an example of an inaccuracy in the global position data of the local base station position leading to a general offset in the method.

FIGS. 6 to 8 illustrate an example of how an inaccuracy in the global position data of the local base station position may lead to a general offset in the method 100 and illustrates a use 300 of the system 200 and of the method for establishing a system reference point 80.

FIG. 6 illustrates an example of an inaccuracy in the global position data 62 of the local base station position 82 leading to a general offset in the method. In one case the illustration may be that of a 'single use operation'. Here, the local base station is physically placed with a local base station position 82, which is used as the reference point for the system 80.

The local base station 2 receives global positioning data 62 using the base GNSS receiver. The global positioning data 62 is given with an inaccuracy given by the global position data corrections 66.

The robot unit 1 used in this embodiment has a driving route 8 shifted parallel to the pattern 9 to be marked, as the nozzle is placed on the side of the robot unit 1. The nozzle may be placed in alternative positions on the robot unit 1 and the driving route 8 be established accordingly.

The robot unit 1 also receives global positioning data 61 but through use of the robot GNSS receiver.

Two flag points 70 are provided. In this illustrated embodiment, the flag points 70 are provided physically on the ground surface 7, and the robot unit 1 is placed with the nozzle positioned at one flag point and in a direction parallel to the orientation of the pattern 9 to be applied. A second flag point 70 may be provided using the direction of the robot unit 1. The flag point positions 72, the robot position 10 and the driving route 8 are now established using the global positioning data 61.

In this case the operation of marking the ground surface 7 is performed without performing an initial correcting for the global position data corrections 66.

During operation the robot unit 1 continuously calculates its current position 10 and adjust its moving direction 11 if the position 10 deviates from the driving route 8. In case the robot unit do not receive any correction data 64 from the local base station 2 the robot unit 1 simply calculates its position using the received global positioning data 61. Hence, if the global positioning data 61 during operation shifts with a given inaccuracy, this inaccuracy emerges directly as an inaccuracy in the marked pattern.

Contrary, using the local base station 2, the base station will because of a fixed position during operation, perceive an inaccuracy in the received global positioning data 62 as exactly that and will communicate position correction data 64 to the robot unit 1, whereby the position 10 of the robot unit 1 is calculated in respect to this inaccuracy, and hence avoiding this inaccuracy to emerge in the marked pattern.

In this case the position correction data 64 will comprise only the change in global positioning data 62 of the local base station 2, this change (denoted Δ62) is illustrated in the curve in the lower part of the figure. The position correction data 64 is communicated to the robot unit 1 using a radio signal 52 or a cellular data signal 54.

In the illustrated embodiment in FIG. 6 in case of 'single use operation' any initial offset in the received global position data 61,62 is not corrected for. And thus, if the pattern is to be refreshed at a later time, the flag points 70, flag point position 72, local base station position 82, and the reference point for the system 80 have to be initialized again. In case these data are not initialized, even in the case of using the same physical position of the local base station position 82, any difference in the received global position data 61,62 from the first marking to a second marking may emerge as an offset in the marking. This is illustrated in FIG. 7 by the dotted lines, illustrating the outline of the second marking shifted compared to the first marking. The reference numbers for the second marking is denoted with apostrophes. In FIG. 7 the offset in the initial received global position data 61,62 from the first marking to a second marking is illustrated by the symbol A and the local base position 82' being the reference point 80' is now coinciding with the actual global position data 62. Hence the following positions are now shifted with the offset: the flag point positions 72', the robot position 10', the driving route 8' and the actual marking of the predefined pattern 9'.

In case the local base station position 82 is a fixed global reference point 5 the offset of the method illustrated in FIG. 7 may be omitted as illustrated in FIG. 8A. The correction data now has the offset incorporated as illustrated in the curve on the right-hand side of the figure.

The method 100 for marking a ground surface according to a predefined marking pattern may in addition to receiving global positioning data 62 of the local base station 2 from multiple global navigation satellites further receive global positioning data 62 of the local base station 2 from a network of one or more external reference base stations.

Alternatively, or in addition thereto RTK position data 68 for establishing the local base station position 82 may be received as illustrated in FIG. 8B providing for an increased accuracy in determining the actual position of the local base station 2 because of an increased accuracy in the global position data corrections 66.

Figure 9:
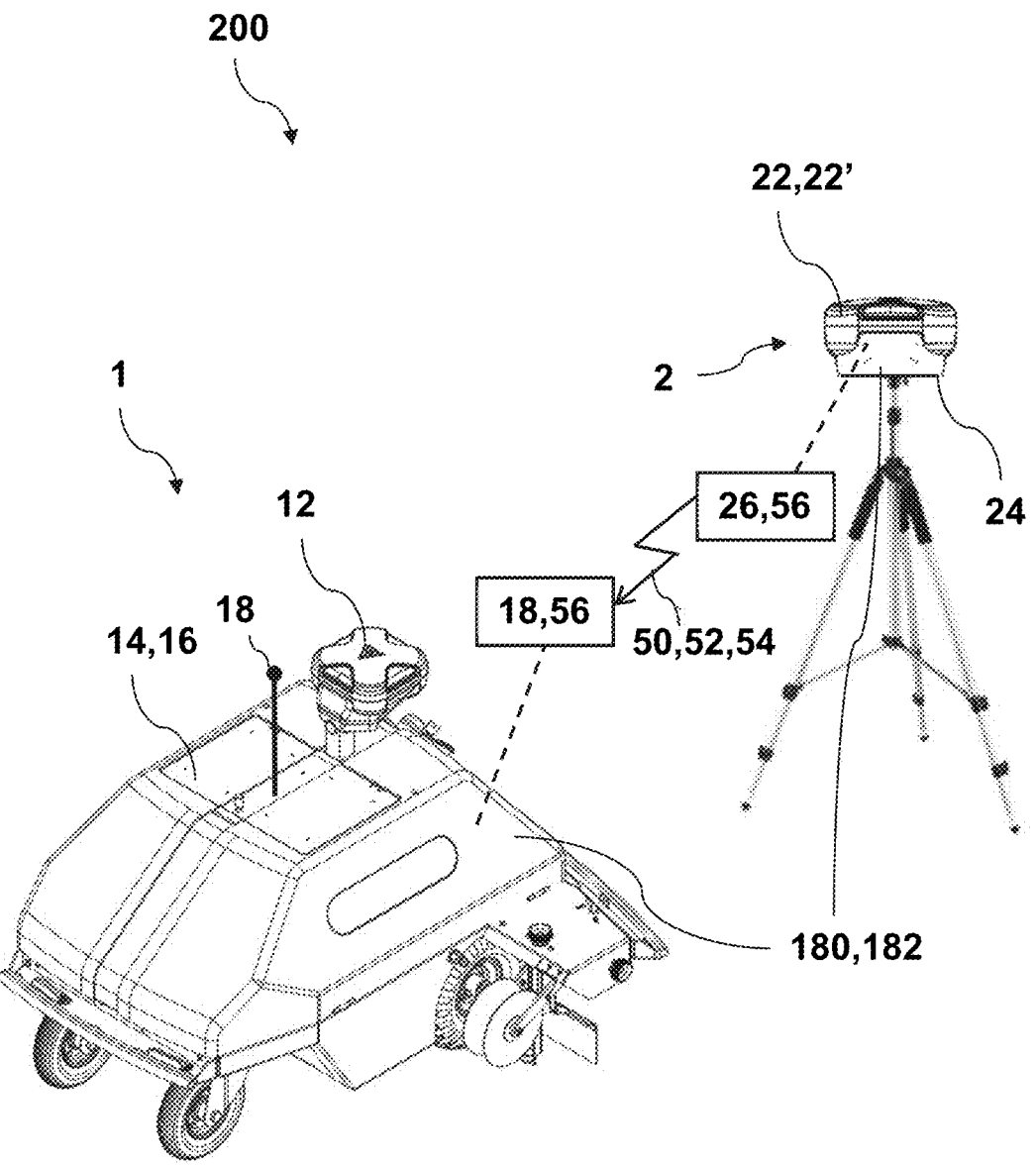
FIG. 9 illustrates one example of a robot unit to be used in the system.

FIG. 9 illustrates one example of the system 200 comprising a robot unit 1 and a local base station 2. The local base station is illustrated mounted on a tripod.

FIG. 9 shows the robot unit 1 in schematic depiction. The robot unit 1 includes a reservoir for marking material. In one aspect, the reservoir may be connected to a pump via a quick connection and connection pipe. The robot unit 1 includes a controller 16 and the robot GNNS receiver 12 and may further include a battery and a chassis frame. The robot unit 1 may continuously calculate its position on the ground surface and control two or more movable elements such as wheels, as in the illustrated embodiment, for controlling the moving direction of the robot unit. Part of the controller's functionality can, as known from mobile robotic systems, be embedded in an external device such as a computer, which the robot unit is in continuous contact with, for example through a radio connection such as via WiFi or BlueTooth or corresponding RF protocol. The controller may comprise means 180 for executing algorithms for determining the robots position.

In a further aspect, the robot unit 1 may further comprise a storage element 182 for storing driving routes and/or predefined patterns.

FIG. 9 further illustrates the local base station 2 in schematic depiction. The local base station 2 includes the base GNSS receiver 22 or alternatively the base RTK GNSS receiver 22'.

In a further aspect, the local base station 2 may further comprise a controller and a storage element 182 for storing driving routes and/or predefined patterns. The controller may comprise means or a device 180 for executing algorithms for calculating global position data corrections.

FIG. 9 further illustrates the local communication connection 50 being a radio signal 52 and/or a cellular data signal 54. Depending on the signal type of the local communication connection 50 the base communication unit 24 may comprise a radio modem 26 and/or a SIM card 56. Accordingly, the robot communication unit 14 may comprise a RF antenna 18 and/or a SIM card 56.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method of initializing a system for marking a ground surface according to a predefined marking pattern, comprising:

providing a system reference point, wherein providing the system reference point includes receiving, by a local base station, global positioning data of the local base station using a base GNSS receiver, wherein the global positioning data is received from a subset of satellites, providing global positioning data of a robot unit using a robot GNSS receiver, wherein the base GNSS receiver and robot GNSS receiver use a common subset of satellites from which they receive the global positioning data, and providing, relative to the system reference point, at least one flag point position and a driving route for the robot unit, wherein the predefined marking pattern to be marked on the ground surface is arranged relative to the at least one flag point position.

2. The method according to claim 1, wherein the system reference point is marked in the ground for reuse of the established system reference point.

3. The method according to claim 1, wherein the at least one flag point is derived from a single point in combination with a direction or a vector.

4. The method according to according to claim 1, comprising a further act of receiving global positioning data of the local base station from a network of one or more external reference base stations.

5. The method according to claim 4, wherein the act of establishing a system reference point is performed using RTK positioning and the act of receiving global positioning data of the local base station is performed using a base RTK GNSS receiver.

6. A method for marking a ground surface according to a predefined marking pattern comprising:

providing a system reference point, wherein the system reference point is established by a local base station;

providing at least one flag point configured as physical points and/or as positioning data;

receiving global positioning data of a robot unit using a robot GNSS receiver;

receiving global positioning data of the local base station using a base GNSS receiver;

providing a flag point position for the at least one flag point;

providing instructions to move the robot unit according to a driving route for the robot unit comprising the predefined marking pattern;

calculating a current position of the robot unit using the received global positioning data of the robot unit, and providing a corrected moving direction of the robot unit according to the driving route using the calculated current position of the robot unit, wherein the predefined marking pattern is arranged relative to the at least one flag point position;

the current position of the robot unit is calculated using the received global positioning data of the robot unit and position correction data from the local base station, and the local base station communicates with the robot unit using a radio signal or a cellular data signal.

7. The method according to claim 6 wherein the at least one flag point is derived from a single point in combination with a direction or a vector.

8. The method according to claim 6, wherein the position correction data from the local base station are transmitted to the robot unit, which position correction data comprises global position data corrections and wherein the act of calculating the current position of the robot unit is performed by the robot unit.

9. The method according to claim 6, wherein the at least one flag point and the driving route of the robot unit is located within a distance of the local base station of 20 km, 5 km, or 2 km.

10. The method according to claim 6, wherein the act of establishing the system reference point is performed using a fixed global reference point.

11. The method according to claim 10, wherein a connector is provided at the fixed global reference point, the connector being adapted for cooperating with a matching connector of the local base station with the base GNSS receiver.

12. The method according to claim 6, wherein the system reference point is saved for reuse for remarking the ground surface.

13. A computer program product, comprising a computer readable hardware storage device having computer readable program code stored therein, said program code executable by a processor of a computer system to implement the method according to claim 6.

14. A non-transitory computer-readable medium having stored thereon the computer program product of claim 13.

15. A method of initializing a system for marking a ground surface according to a predefined marking pattern, comprising:

providing a system reference point, wherein providing the system reference point includes receiving, by a fixed local base station, global positioning data of the fixed local base station using a base GNSS receiver, wherein the global positioning data is received from a subset of satellites, providing global positioning data of a robot unit using a robot GNSS receiver, wherein the base GNSS receiver and robot GNSS receiver use a common subset of satellites from which they receive the global positioning data, and providing, relative to the system reference point, at least one flag point position and a driving route for the robot unit, wherein the predefined marking pattern to be marked on the ground surface is arranged relative to the at least one flag point position.

16. The method according to claim 15, wherein the fixed local base station is the system reference point.

17. The method according to claim 15, wherein the at least one flag point is derived from a single point in combination with a direction or a vector.

* * * * *